(12) United States Patent
Staffiere et al.

(10) Patent No.: US 8,256,742 B2
(45) Date of Patent: Sep. 4, 2012

(54) MANUAL TO AUTOMATIC VALVE CONVERSION DEVICE

(75) Inventors: Donald Staffiere, Amherst, NH (US);
Don L Drinkwater, Carlisle, MA (US);
David Staffiere, Merrimack, NH (US);
Dana St. James, Mansfield, MA (US)

(73) Assignee: Custom Controls LLC, Carlisle, MA (US)

( * ) Notice: Subject to any disclaimer, the term of this patent is extended or adjusted under 35 U.S.C. 154(b) by 793 days.

(21) Appl. No.: 11/846,559

(22) Filed: Aug. 29, 2007

(65) Prior Publication Data

US 2008/0054209 A1    Mar. 6, 2008

Related U.S. Application Data

(60) Provisional application No. 60/823,798, filed on Aug. 29, 2006.

(51) Int. Cl.
*F16K 51/00* (2006.01)
(52) U.S. Cl. .................. 251/129.11; 251/292
(58) Field of Classification Search .......... 251/129.11–129.13, 292
See application file for complete search history.

(56) References Cited

U.S. PATENT DOCUMENTS

| | | | |
|---|---|---|---|
| 3,430,916 A * | 3/1969 | Raymond, Jr. ................. 251/71 |
| 3,692,043 A | 9/1972 | Waskowsky | |
| 4,131,133 A * | 12/1978 | Huwe ................. 137/624.11 |
| 4,313,595 A | 2/1982 | Markley | |
| 4,629,157 A * | 12/1986 | Tsuchiya et al. ............. 251/96 |
| 4,705,063 A | 11/1987 | Robinson | |
| 4,719,939 A * | 1/1988 | Killian ..................... 137/315.35 |
| 4,887,634 A | 12/1989 | Killian | |
| 4,921,012 A | 5/1990 | Bratten | |
| 5,004,014 A | 4/1991 | Bender | |
| 5,038,820 A | 8/1991 | Ames et al. | |
| 5,086,526 A | 2/1992 | Marcke | |
| 5,086,806 A | 2/1992 | Engler et al. | |
| 5,131,623 A * | 7/1992 | Giordani .................. 251/129.03 |
| 5,257,771 A * | 11/1993 | Portis et al. ................. 251/293 |
| 5,409,037 A | 4/1995 | Wheeler et al. | |
| 5,540,414 A * | 7/1996 | Giordani et al. ............. 251/174 |
| 5,564,461 A | 10/1996 | Raymond | |
| 5,568,825 A | 10/1996 | Faulk | |
| 5,570,869 A | 11/1996 | Diaz et al. | |
| 5,634,486 A * | 6/1997 | Hatting et al. .......... 137/315.01 |
| 5,954,088 A | 9/1999 | Huang | |

(Continued)

OTHER PUBLICATIONS

Eaton Electrical, Inc., HOMEheartbeat—Water Shut-off Controller, User's Guide, Copyright 2006, 32 pages, www.homeheartbeat.com.

*Primary Examiner* — John Bastianelli
(74) *Attorney, Agent, or Firm* — Maine Cernota & Rardin

(57) ABSTRACT

A sensor and powered valve actuator assembly adaptable to fit on and operate a manual valve, the sensor for detecting a valve operating trigger event such as a fluid leak, the actuator for automatically operating the manual valve in response to the triggering event. The assembly includes a motor, motor control circuit, operating shaft, and manual valve engaging member, in a housing mountable to a manual valve body. A sensor which may be remote to the housing is connected to the motor control circuit. When mounted, the valve engaging members extend from the shaft into flexible, rotational engagement with the manual valve shaft, such as with tines spanning or piercing the valve handle. The control circuit controls the motor based on a signal from the sensor, or other control means, such that the motor can actuate valve operation.

14 Claims, 11 Drawing Sheets

U.S. PATENT DOCUMENTS

| | | | |
|---|---|---|---|
| 5,967,171 A * | 10/1999 | Dwyer, Jr. | 137/78.1 |
| 6,065,735 A | 5/2000 | Clark | |
| 6,070,852 A | 6/2000 | McDonnell et al. | |
| 6,125,868 A * | 10/2000 | Murphy et al. | 137/1 |
| 6,206,337 B1 | 3/2001 | Veillet, Jr. | |
| 6,253,785 B1 | 7/2001 | Shumake, Jr. et al. | |
| 6,662,821 B2 * | 12/2003 | Jacobsen et al. | 137/312 |
| 6,701,951 B1 | 3/2004 | Drinkwater | |
| 6,742,765 B2 * | 6/2004 | Takano et al. | 251/292 |
| 7,048,251 B2 * | 5/2006 | Schreiner | 251/291 |
| 7,066,192 B1 * | 6/2006 | Delaney et al. | 137/15.18 |

* cited by examiner

US 8,256,742 B2

MANUAL TO AUTOMATIC VALVE CONVERSION DEVICE

RELATED APPLICATIONS

This application claims the benefit of U.S. Provisional Application No. 60/823,798, filed Aug. 29, 2006, which is herein incorporated in its entirety by reference.

FIELD OF THE INVENTION

The invention is related to the field of valve actuators, and more particularly to an electronically controlled, motorized valve actuator kit for adapting manually operated valves to automated operation.

BACKGROUND OF THE INVENTION

Replacing a manually controlled valve with an electronically controlled automatic valve requires installing an expensive valve in an existing water, gas or fluid supply conduit, and providing a power source, for example pneumatic or electric power. In most cases, this requires a plumber or other skilled tradesman to execute the installation. The cost of installation may exceed the cost of the motorized valve. A method to easily and inexpensively convert a manually controlled valve into an automatic valve would provide a valuable solution to many applications.

In response to this need, a device that can be added inexpensively and easily to shut off the water supply to a property or to an appliance located at the property and can be controlled to shut off the water under a variety of conditions was developed and is disclosed in U.S. Pat. No. 6,701,951 B1 to Drinkwater.

There are various other designs and implementations for automatically controlling various manual shut-off valves, varying in cost and complexity. However, what is needed is a valve actuator system that is more easily adapted to existing manual valves without interrupting plumbing connections, and configurable to effectively conduct or cause a valve control action such as a shut-down or shut-off action upon the occurrence of a specific event or condition.

SUMMARY OF THE INVENTION

It is a goal of the invention to provide an easy and inexpensive way to convert a variety of standard, off-the-shelf manually operated valves, such as ball valves, gate valves and air flow dampers, into electronically controlled, power-actuated valves. According to one aspect of the invention, there is an electronic valve actuator system or kit which is scalable in design and adaptable to various types and sizes of valves including inlet, in-line and outlet valves in a fluid flow conduit.

The term "fluid" is here intended to include any non-solid or flowable material that in its operative state or phase is commonly contained within and transported through an enclosed conduit system of any type, where valves or dampers are employed to open, close, restrict, route or otherwise control the material flow within the conduit. Such conduits and manual control valves to which the invention is directed may be found in stationary settings such as industrial facilities and in buildings of all kinds, or in mobile settings such as on shipboard, aircraft, or land vehicles.

For example, a valve actuator system or kit of the invention may be coupled to a manual shut-off valve in a manner that provides for mechanized or motorized operation of the valve from one setting to another, such as from full on to full off, automatically upon the occurrence of a specific event or condition by means of a triggering mechanism and/or sensor system connected to a motor control circuit. Valve stem rotation between full on and full off is in some manual valves such as common ball valves, be a simple one quarter turn. In other valves, such as common gate valves, it may require multiple turns.

In another aspect, an electronically controlled, spring or motor actuator system coupled to a manual valve may be configured to make the valve responsive to a variety of conditions, such as the presence of water at a location normally dry, using appropriate sensors and/or switches or computer connections which may be positioned locally or remotely. Either or both the actuator and the sensors may be accessible and controllable via internet monitoring or telephone or wireless means. Other conditions that might be used to set or trigger an automatic valve actuation include but are not limited to: change in temperature, e.g. thermal stress or fire alarm; the presence of selected gases in the air, e.g. carbon monoxide detector; exhaustion of a fuel supply, e.g. heating system fuel depletion; automated or manually executed commands from a computer or other network device to which the actuator system is electronically connected; and a detected motion or physical disturbance to or intrusion into a monitored space, such as by use of a motion detector.

In yet another aspect of the invention there is provided a flexible housing and mounting structure for the valve actuator and coupling components such that when the actuator system and manual valve are properly coupled, they can smoothly operate together as an automated valve assembly regardless of the various type and operating position and range of shaft translation and rotation of the knob, handle or lever of the manual valve. A flexible or less than rigid coupling method between the manual valve mechanism and the valve actuator enables the valve actuator to be more easily installed on a variety of manual valve styles, and to operate satisfactorily with less than perfect alignment between the actuator shaft and the valve shaft.

In a further aspect of the invention there is provided a mounting structure and method such that the motor-actuator component can be installed easily on a manual valve assembly, without having to open the line or disassemble the valve.

In another aspect, there may be adapters fitted to or compatible with specific valve handles or specially configured engagement forks for mating to or engagement with valve handles of various geometries.

In yet another aspect of the invention the motor may be electric or pneumatic or spring powered, generating rotational motion or linear motion convertible to rotation for shaft operation. There may be included a self-contained power supply such as a battery and/or compressed air cartridge, so that the actuator, and if so configured, a related sensor system, can function independently of, or alternatively as a backup to, traditional or common power sources. A spring actuated motor may include means for rewinding or resetting, after a valve operating event has occurred.

A still further aspect of the invention provides for a flexible or non-rigid containment and relationship of the components of the invention within the housing and in relationship with the manual valve to which it is mounted, such that the stress introduced by slight mis-alignment or resistance of the valve handle to engagement and rotation by the engagement fork and actuator shaft is distributed and accommodated to some extent by minor realignment or responsive movement of the actuator system components within the housing.

An additional aspect of the invention provides for selecting from among different valve handle engagement fork designs to accommodate different styles of valve handles.

This and other goals and objectives of the invention may be achieved by an electronically controlled, motorized valve actuator device that is easily mounted to and mated with an existing manually controlled valve. The device may include a valve actuator motor, an actuator shaft operatively connected to the motor, a valve handle engagement fork that may use various adapters to match various valve handle geometries, and a motor control circuit board, all cooperatively organized and contained within a housing that is attachable to the valve body and/or the fluid conduit immediately adjacent thereto. Provision is required for power for the motor and motor control circuit and may be in the form of an internal or external, dedicated or shared power source. The power source may be in a stored energy or line energy form, such as a battery or compressed air cartridge or an electrical or pneumatic connection to a suitable source, or a spring such as a coiled spring and gear set, wherein the motor control circuit may be a solenoid or other spring release or trip mechanism.

In its mounted or coupled position on a manual valve, the actuator system housing may be configured such that the valve actuator shaft is oriented above and substantially co-axially to the valve stem, proximate the valve handle. The housing may hold the motor in a floating or semi-floating, non-rotational relationship with the valve body so that torque may be applied to the valve handle via the actuator shaft and valve handle engagement fork.

At least one tine or member of the valve engagement fork may extend from the actuator shaft to or through the operating plane of the valve handle, on the axis of the valve stem or off the axis of the valve stem but within the radius of the valve handle, such that upon operation of the motor and rotation of the actuator shaft, at least one tine or member of the engagement fork must engage the valve handle rotationally and thereby cause the handle and valve stem to rotate in an open or closed direction up to the mechanical limit or design stop position of the valve. The motor control circuit board may control the motor direction and torque, based on the signal from the sensor system, switches, or other local or remote control such that the motor can operate the valve on or off or otherwise modulate the fluid flow through the valve.

Motor torque may be preset or adjustable to a maximum value greater than maximum valve handle resistance to rotation and less than the valve stop structural limits, in order to avoid damage to the valve. The motor control circuit and actuator motor may provide for a simple on/off valve operation, rotating the valve handle from the open stop to the closed stop, or it may provide for adjustable flow control by timed or stepped range valve operation. Further, it may be incorporated into a process control loop using a sensor system and feedback signal for dynamic valve operation and flow control in the fluid conduit.

The actuator shaft may have a sliding, non-rotational fitment to the motor such that the shaft can accommodate vertical or axial translation for either or both flexibility in being fitted to various valve types and sizes, and to accommodate the axial translation of a multi-turn gate valve handle and stem as the valve is operated between fully closed and fully open.

Repetitive cycles of valve operation by a device of the invention is not a requirement of all embodiments; embodiments capable of easy attachment to a manual valve, of enduring long standby periods and still providing one reliable valve open or closure cycle upon the occurrence of an exceptional event such as detection of a probable water or fluid leak, are very useful devices and within the scope of the invention. Such examples may require any or all of removal, a manual reset and testing of the sensor and spring trip or motor drive mechanism, and remounting on the valve body in order to be restored to service. Other aspects and advantages of the invention will be readily apparent from the description, figures and claims that follow.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

Figure 1:
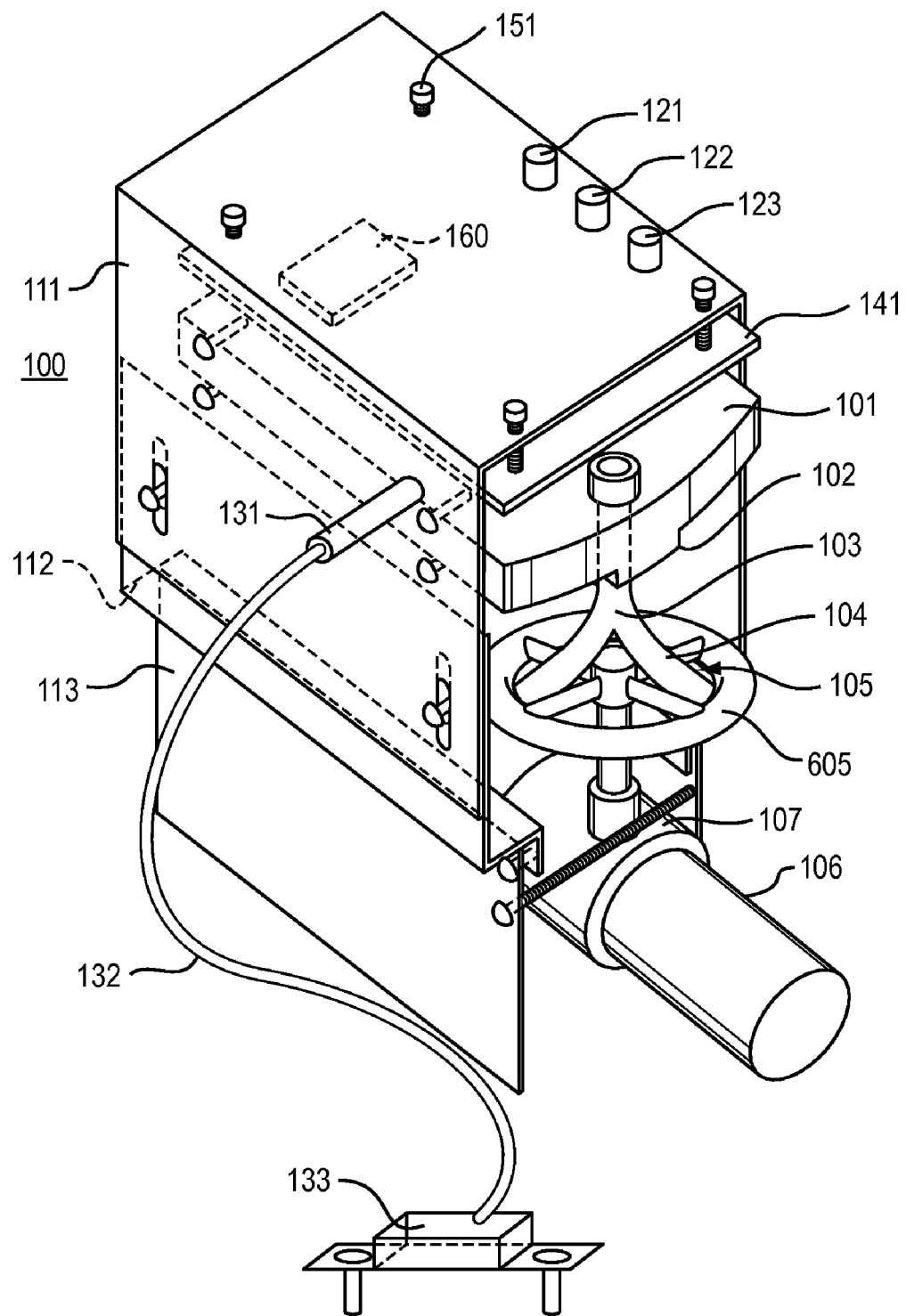
FIG. 1 is a perspective view of a device coupled to an inline valve on a pipe according to one embodiment of the present invention.
Figure 2:
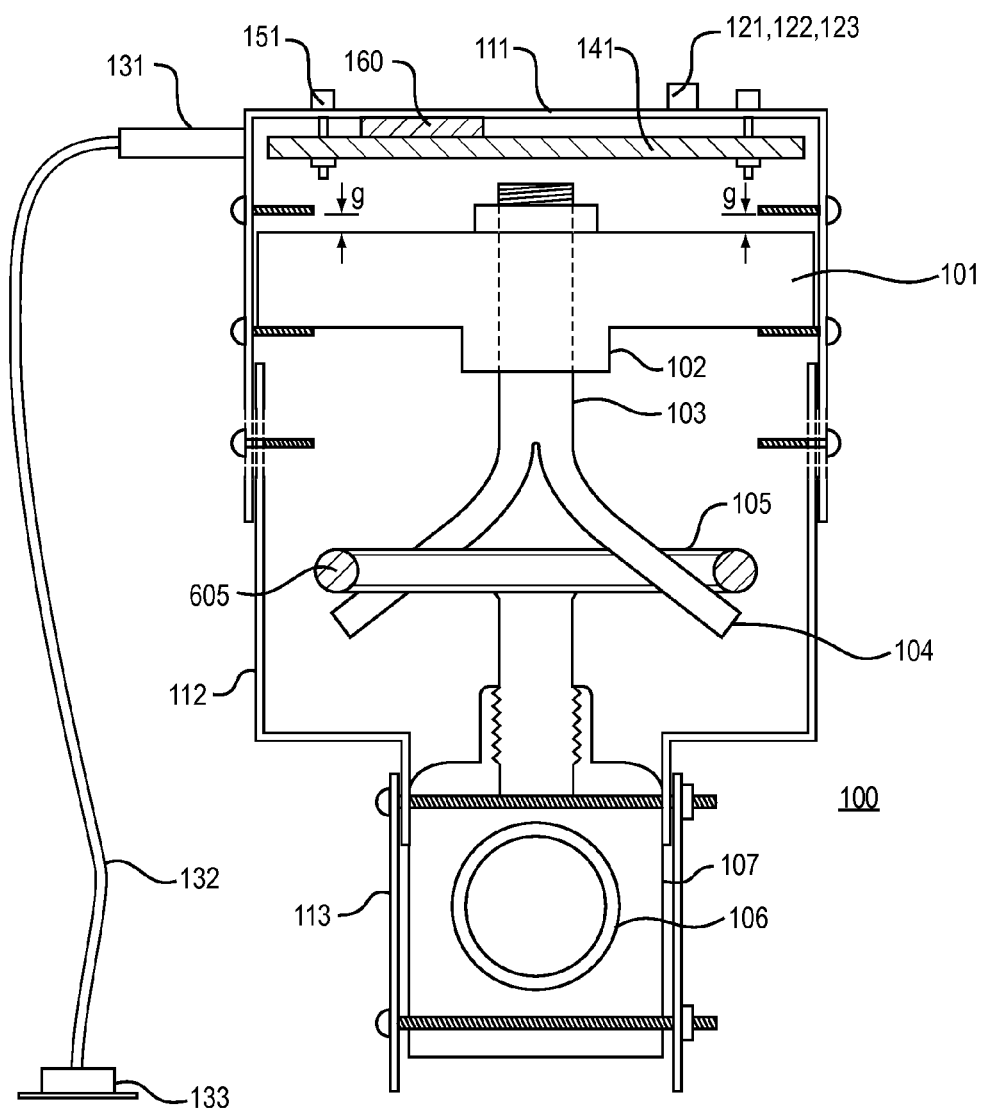
FIG. 2 is a longitudinal cross-sectional view of the device of FIG. 1.

The invention is susceptible of many embodiments and variations. What is described here is illustrative but not limiting of the scope of the invention. Referring to FIG. 1 and FIG. 2, there is illustrated one embodiment of the invention, showing an electronically controlled valve actuator 100, consisting of motor assembly 101 and control circuit board 141 operatively coupled to valve 107, which controls water flow in pipe 106. Housing sections 111, 112, 113 are cooperatively connected together and to the pipe 106 thereby securing valve actuator 100 to any valve 107. Valves to which the invention is applicable include ball valves, gate valves, air duct dampers and other or any valve type having a valve stem and handle by which it is operated. Variations of this and other embodiments of the invention provide for powered actuation of valves that may require anywhere from a small fraction of a full turn up to multiple turns of rotation of the manual valve stem to go from valve stop, e.g. full open, to opposing valve stop, e.g. fully closed.

The valve actuator housing for this embodiment includes upper housing section 111, and lower housing sections 112, 113. Upper housing section 111 has a top and two sides extending approximately orthogonally from the top as detailed elsewhere herein. Lower housing sections 112, 113 comprise two separate components in this embodiment although a single lower housing section is a further embodiment. There are two lower housing sections 112, 113 arranged on each side of the upper housing 111. The first lower housing section 112 also called the middle housing section has a side wall that partially overlaps and is fastened to the sides of upper housing section 111. The first lower housing section 112 in this embodiment includes an inwardly angled portion with a further side section extending therefrom. The second lower housing section 113 couples to the first lower housing section 112 at the further side section on one end and allows engagement with the opposing second lower housing section 113 thereby coupling the valve actuator 100 about the pipe 106.

Inside the upper housing 111, control circuit board 141 is internally attached to the top via fasteners 151. Various mounting configurations are within the scope of the invention.

In this particular embodiment, three operating switches 121, 122, and 123 operatively connected to control circuit board 141. These switches 121, 122, 123 are accessible from the exterior of the housing 111 and provide a mechanism for an operator to manually control the operation of the valve without having to remove either of housing sections 111, 112.

The motor assembly 101 is flexibly contained within the upper housing section 111 and electrically coupled to the control board 141. The motor assembly 101 typically obtains power and control commands from the control board 141, although motor power may be supplied from another source. The motor in many embodiments may be characterized as "floating" within its allotted space in the housing so as to provide a greater degree or range of rotational and translational alignment of the valve actuator shaft and engagement fork with the manual valve handle.

According to a wired sensor embodiment, a connector 131 interfaces with the housing 111 and is operatively coupled to the control circuit board 141. This connector 131 is wired 132 to a sensor 133, such as a water sensor, and can be mounted such that rising water from a leak will trigger the sensor to shut off the valve and hence the water supply, thereby limiting potential water damage and wasted water.

Control circuit board 141 may receive a signal from at least one sensor 133, switches 121, 122, or 123, or a remote control device via a communications interface on the control board 141. Batteries 160 would typically be coupled to the control circuit board 141, and may be located in any appropriate location inside or adjacent the valve actuator housing.

Motor assembly 101 generally includes a drive circuit (not shown) which serves to reduce the speed and increase the torque of the motor. The drive circuit can be eliminated if the motor is designed to produce relatively high torque at low speeds. Motor assembly 101 further includes a rotary coupling 102. Shaft 103 is inserted into this rotary coupling 102 so as to be slidingly engaged and is operatively connected to the rotary component of the motor assembly 101. Shaft 103 and rotary coupling 102 are in splined or serrated engagement with each other so as to rotate together while permitting a limited range of translation of the shaft within the rotary coupling. Shaft 103 terminates at its lower end in a valve engagement fork 104. In this configuration, valve engagement fork 104 has at least two tines or fingers that can be inserted into wheel handle holes 105 of wheel handle 605 of valve 107.

It will be appreciated that the relationship of the engagement fork or tines with the valve handle might be characterized as an intermeshing or intertwining of the tines within the spokes or holes of the handle, with no actual or rigid attachment, whereby the rotation of the actuator shaft and fork causes the tines to contact the spokes and force them into concurrent rotation, until the valve reaches the end of its travel and resistance to rotation of the valve handle is greater than the available torque of the actuator. The sliding translational range of the actuator shaft provides for a range of installations where the motor-to-valve handle dimension may vary, and moreover for the actual translation of a valve handle in the valve stem axial direction as a multi-turn valve operates.

Various means or no means may be incorporated into the actuator to recognize the valve mechanism is at its limit, including but not limited to; change in motor or current or voltage, rise in motor temperature, number of turns of rotation completed, cessation of rotational movement once started, and timing out of a pre-determined maximum duty cycle time.

Figure 3:
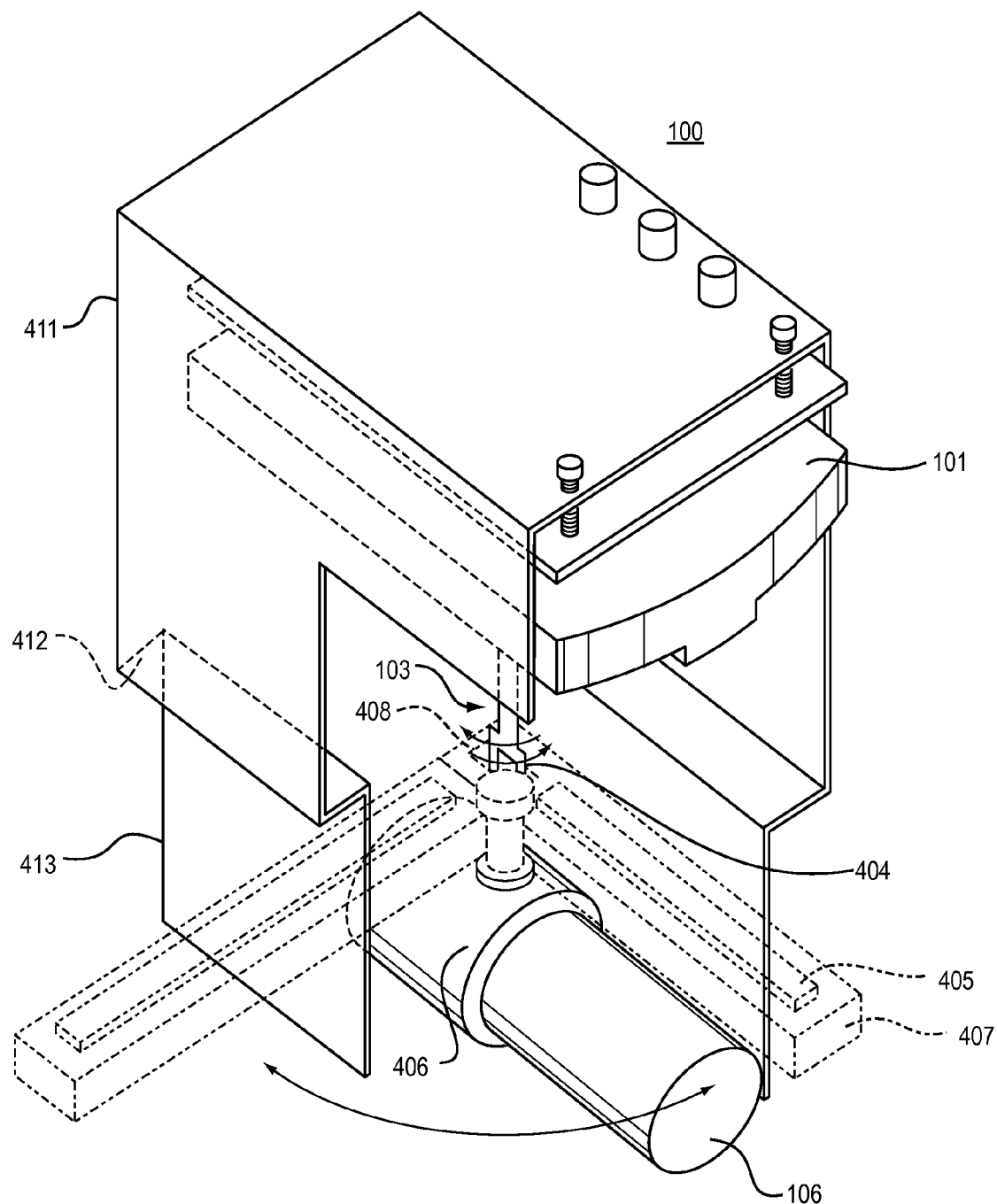
FIG. 3 is a perspective view of a device according to another embodiment of the present invention, coupled to a lever handle valve.
Figure 4:
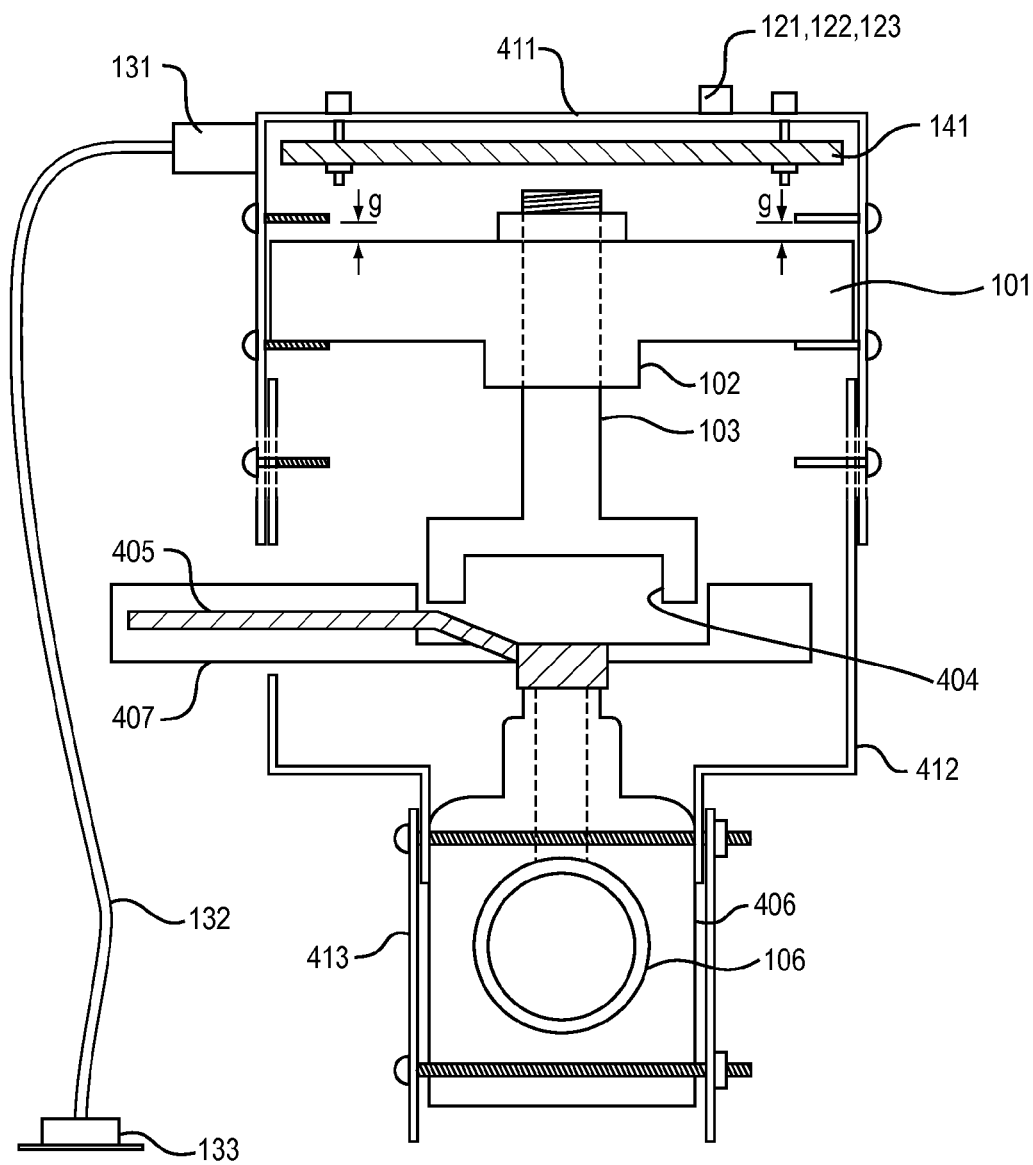
FIG. 4 is a longitudinal cross-sectional view of the device of FIG. 3.

Referring now to FIGS. 3 and 4, another embodiment of the invention, consists of a motor assembly 101 and control circuit board 141 mounted to ball valve 406 via mounting housing sections 411, 412, and 413. This ball valve has a conventional bar-like valve handle configured for 90 degrees of rotation between open, oriented in line with the pipe or conduit, and closed, protruding at a right angle from the pipe or conduit. To accommodate the length and swing range of the valve handle, part of the one side wall of middle housing section 412 is removed so that valve handle 405 can move from open to close position or vice versa without interference by the housing. In addition, an inverted U-shaped longitudinal adapter bracket 407 disposed over valve handle 405, and is configured with an engagement slot 408 configured to accept the tines of engagement fork 404. Thus, shaft 103, bracket 407, and valve handle 405 rotate together according to the signal from control circuit board 141, thereby opening or closing ball valve 406. Control circuit board 141 gets a signal from sensor 133, switches 121, 122, or 123, or even a remote control not described in FIG. 3. Although not described in FIGS. 3 and 4, batteries coupled with control circuit board 141 can be located in any appropriate location inside or proximate the housing.

Figure 5A:
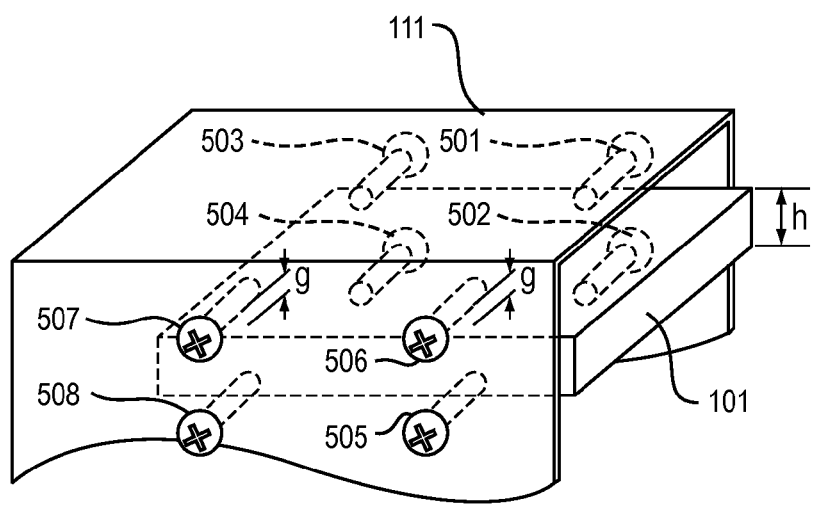
FIG. 5A shows a more detailed view of one manner of mounting the actuator motor within the upper housing of the device of FIG. 1.

FIG. 5A shows a more detailed view of one manner of mounting motor assembly 101 to upper housing section 111. At least 8 screws 501 through 508 are used to form two groups of screws. In each group, at least 4 screws (502, 504, 505, and 508) and (501, 503, 506, and 507) are generally located within a single plane, and fastened to the side of upper housing section 111, protruding inwardly in a distributed manner so as to support and contain motor assembly 101 within the interplanar space in the housing. The distance between the two planes formed by each group of screws is predetermined depending on height "h" of motor assembly 101 such that there be gap "g" between motor assembly 101 and the mounting screws planes, whereby motor assembly 101 can move up and down somewhat, "g" being less than "h", for example less than ½ "h". The motor assembly is similarly loosely constrained laterally within the housing, so as to enable a limited degree of re-orientation of the motor assembly, shaft, and fork to the valve handle within the housing to distribute the rotational stress among the components as torque is developed and the handle is forced to rotate. The housing itself is in some embodiments intentionally flexible for the same reason. Up to plus or minus 15 degrees of rotational alignment range may be provided by the combination of flexible housing and floating motor assembly. Additionally, the translational range of the actuator shaft with respect to the motor in some embodiments may at least equal to the translation distance of the valve handle and valve to which the actuator is being attached, permitting the fork to ride up and down with the valve handle as it rotates.

Figure 5B:
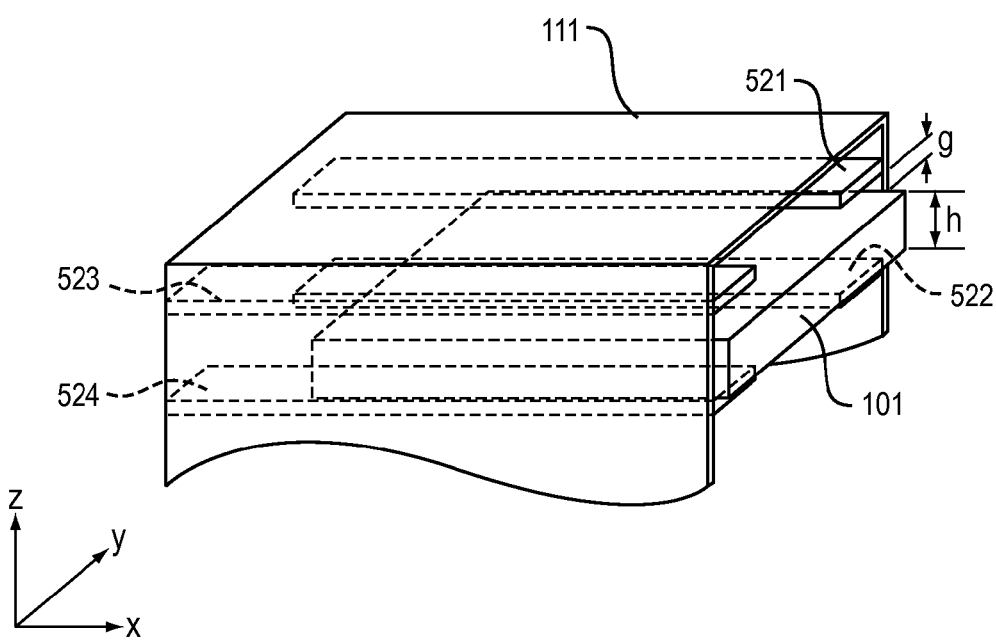
FIG. 5B shows a more detailed view of another mounting the actuator motor within the upper housing of the device of FIG. 1.

FIG. 5B shows a more detailed view of another manner of mounting motor assembly 101 to upper housing section 111. In this embodiment, 4 inwardly protruding support flanges 521, 522, 523, and 524 are attached inside of upper housing 111, two flanges 522 and 524 in a lower plane and the other two flanges 521 and 523 in an upper plane. The distance between the two planes formed by each group of support flanges is predetermined depending on height "h" of motor assembly 101 such that there be a gap "g" between motor assembly 101 and the mounting rack planes, "g" being less than "h", for example less than ½ "h", whereby motor assembly 101 can move up and down to a limited extent so as to enable a limited degree of re-orientation of the motor, shaft, fork and valve handle within the housing to distribute the rotational stress among the components as torque is developed and the handle is forced to rotate.

Figure 6A:
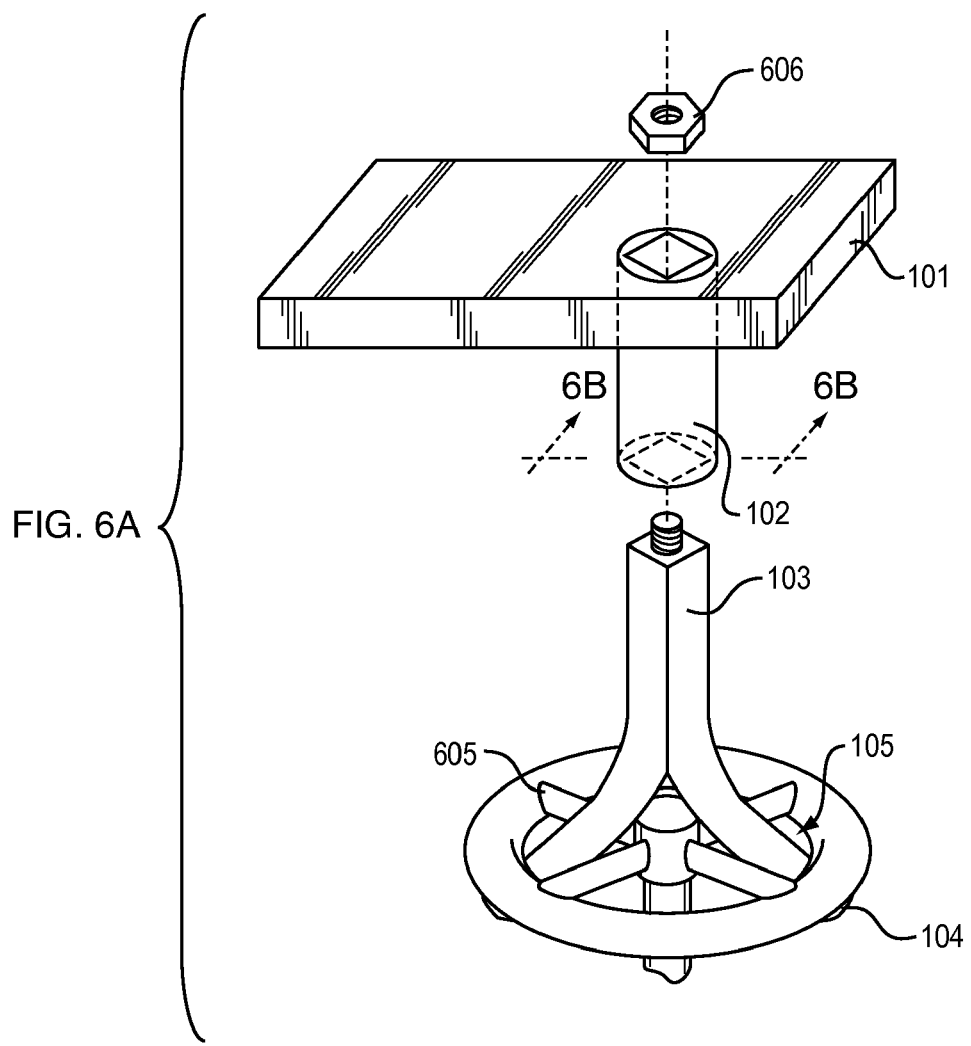
FIG. 6A shows a more detailed view of one manner of connecting an actuator shaft to an actuator motor, the shaft illustrated here with its lower end engagement fork engaged with a valve handle as in the device of FIG. 1.
Figure 6B:
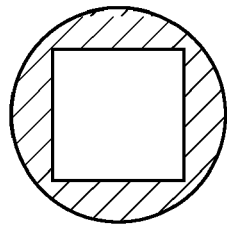
FIGS. 6B, 6C and 6D show three of many possible cross sectional views of the motor-mating end of an actuator shaft according to various embodiments of the present invention, each configured for non-rotational fitment to the chuck of an actuator motor.
Figure 6C:
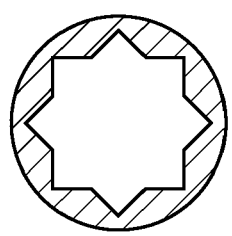
Figure 6D:
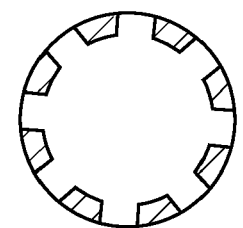

Referring now to FIGS. 6A, 6B, 6C, and 6D; FIG. 6A shows a more detailed view of one manner of engaging shaft 103 into both motor assembly 101 and valve wheel 605 through valve wheel holes 105. Shaft 103 and rotary shaft 102 are in splined or serrated engagement with each other, and rotate together. FIGS. 6B, 6C, and 6D shows three embodiments of the cross section of shaft 103. The lower end of shaft 103 terminates as a valve engagement fork 104. Valve engagement fork 104 has at least two tines or fingers that can be inserted into holes of valve wheel 105. Other embodiments may employ only one tine, offset from the stem or shaft centerline so as to introduce turning torque when the actuator is operating. The installation can be done as follows: first, engage the tines into valve wheel 605 through holes in the wheel 105; second, slidingly engage the rotary shaft 102 of motor assembly 101 with the other end of shaft 103 such that they rotate together. Upper and lower shaft stops may be employed to limit or define the translation or sliding range of shaft 103 up and down within the throat of rotary shaft 102.

Figure 7:
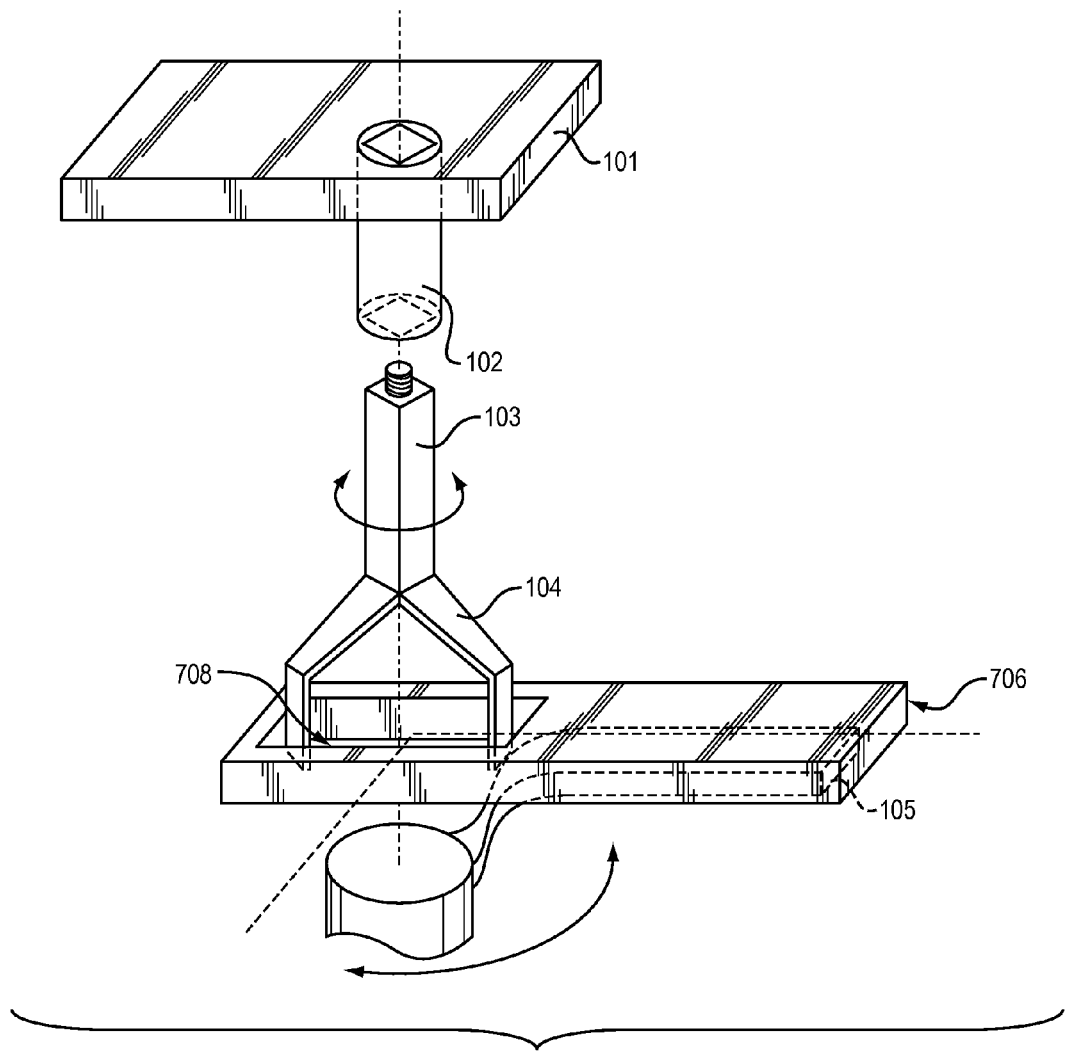
FIG. 7 shows a more detailed view of one manner of connecting an actuator shaft to an actuator motor, the shaft illustrated here with its lower end engagement fork engaged with a valve handle as in the device of FIG. 3.

Referring now to FIG. 7, there is illustrated a more detailed view of one manner of engaging shaft 103 into both motor assembly 101 and valve handle 105. The valve here is a ball valve and has valve handle 105. Shaft 103 and rotary shaft 102 are in splined or serrated engagement with each other, and rotate together. Shaft 103 has valve engagement fork 104 extending from its lower end. An inverted U-shaped adapter bracket 706 is operatively disposed on valve handle 105. The bracket 706 has an engagement slot 708. Valve engagement fork 104 has two tines that are inserted into engagement slot 708 of the bracket 706. The installation can be done as follows: first, operatively locate the bracket 706 upon valve handle 105; second, engage tines of fork 104 into engagement slot 708 of the bracket 706; finally, engage the other end of shaft 103 into motor assembly 101 through rotary shaft 102 such that they rotate together.

Referring briefly now back to FIG. 1. The housing consists of upper housing section 111, middle housing section 112, and lower housing section 113. Upper housing section 111 has a top from which two sides extend. Middle housing section 112 has two substantially parallel side walls. On one end, these side walls partly overlap with and are fastened to the sides of upper housing section 111. On the other end, the gap between these side walls is narrowed or stepped down or inward in their distance of separation to conform roughly to the outside diameter or dimension of the conduit or water supply pipe in which the valve is installed. Both upper housing section 111 and middle housing section 112 have several longitudinal slots on their side walls that provide for adjustment in the relative positioning of the sections while permitting fasteners to be located therein. By adjusting the relative position between upper housing section 111 and middle housing section 112, the total height of the mounting housing can be varied. Thus, the device can be adapted to various valve system sizes and geometries.

Lower housing section 113 has two substantially parallel side walls, which are fastened to the narrowed side walls of middle housing section 112 on one end. Lower housing 113 is securely mounted to the water supply pipe via fasteners as illustrated.

Referring briefly now back to FIG. 3. Part of the one side wall of middle housing 412 of FIG. 3 is cut out, removed, or omitted such that the valve handle of a ball valve can move from open to close position or vice versa.

Figure 8:
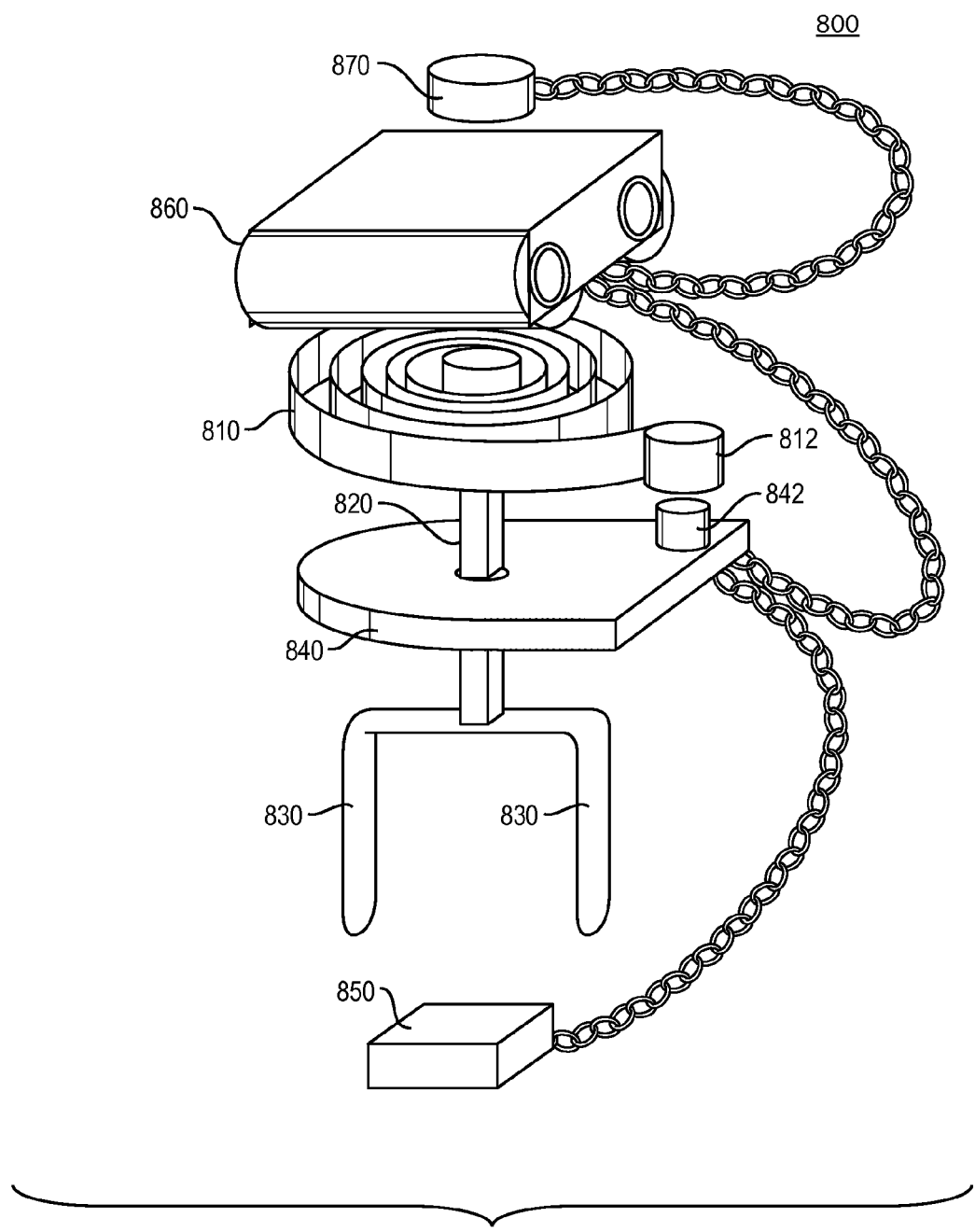
FIG. 8 is an exploded perspective view of the components of a spring operated valve actuator of the invention, with sensor and solenoid operated spring release.

Referring to FIG. 8, there is an exploded view of the components of a mechanized valve actuator assembly 800 that is spring powered, shown with the housing excluded. It is intended to be mounted to a manual valve body in the manner previously described. Coil spring 810 when it unwinds, rotates operating shaft 820, which rotates engagement fork 830 to flexibly engage and operate a valve shaft of a manual valve in a fluid or air flow system in the manner described above. It may be a ball valve, gate valve, air duct damper or other valve type having a valve stem and handle by which it is operated. It may require a small fraction of a full turn up to multiple turns of rotation of the valve stem to go from valve stop, e.g. full open, to opposing valve stop, e.g. fully closed. A fixed end 812 of coil spring 810 is secured by pin 842 to shaft lock and release mechanism 840. A solenoid and control circuit (not shown) within mechanism 840 locks shaft 820 so as to maintain coil spring 810 in a coiled state. When sensor 850 detects a triggering condition such as a water leak, the control circuit and solenoid within mechanism 840 releases shaft 820 and coil spring 810 for rotation, causing fork 830 through its flexible engagement contact with the valve stem and handle of the manual valve to actuate the valve. The sensor 850 and control circuit are powered by battery pack 860. A ready light 870 indicates battery condition. This spring powered embodiment is intended for a protective mode of operation where a triggering event and valve operation is an exception to normal operation; and requires removal of the assembly, rewinding of the coil spring and a reset of the assembly on the manual valve body in order to restore the actuator assembly to operational readiness after the exception situation is normalized. In some installations valve operation may mean closure, in others it may mean opening the valve. Variations of the spring powered actuator embodiments may include multiple springs or springs other than coil springs, and gear trains for torque.

Figure 9A:
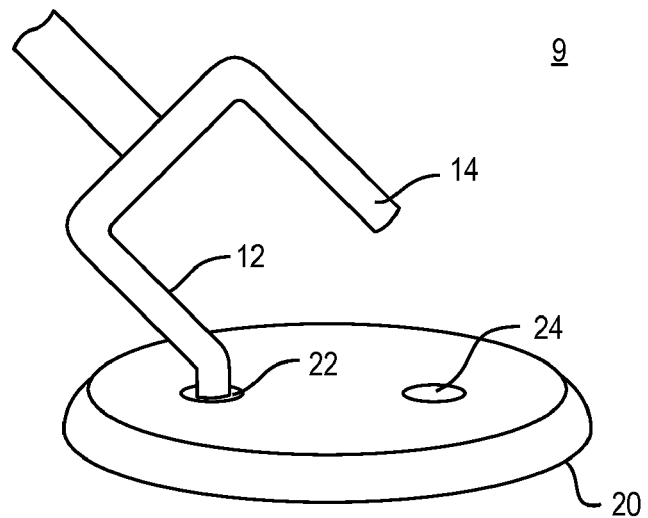
FIGS. 9A and 9B are side views of one embodiment of an actuator shaft and tines, where one tine terminates in an L shape, requiring the shaft to be rotated on its side in order to start the tine into a receiving hole in a valve handle, and rotated upward into axial alignment order to engage the second tine in another hole.
Figure 9B:
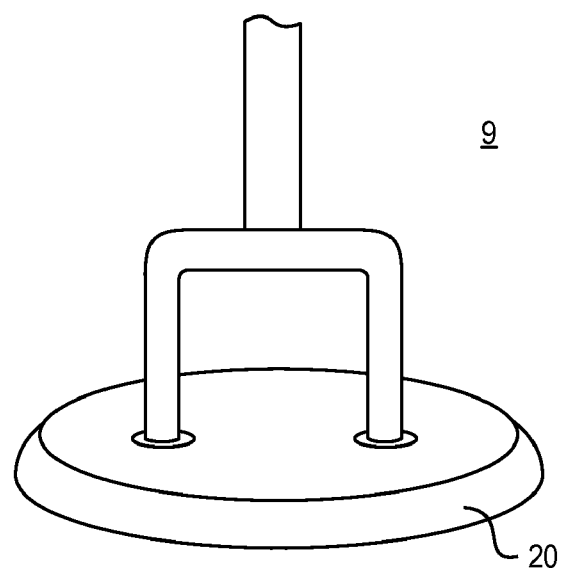

Referring to FIGS. 9A and 9B, one embodiment of an actuator and engagement fork component 9 has one tine 12 terminating in an L shape, pointing away from a second tine 14, whereby component 9 must be laid over as in FIG. 9A relative to valve handle 20 in order to engage tine 12 in hole 22, and then straightened up as in FIG. 9B in order to engage tine 14 in hole 24. It will be readily apparent that other and numerous variations on the L shape tine or multiple tines may be employed for similarly engaging the shaft and fork with a valve handle.

Figure 10:
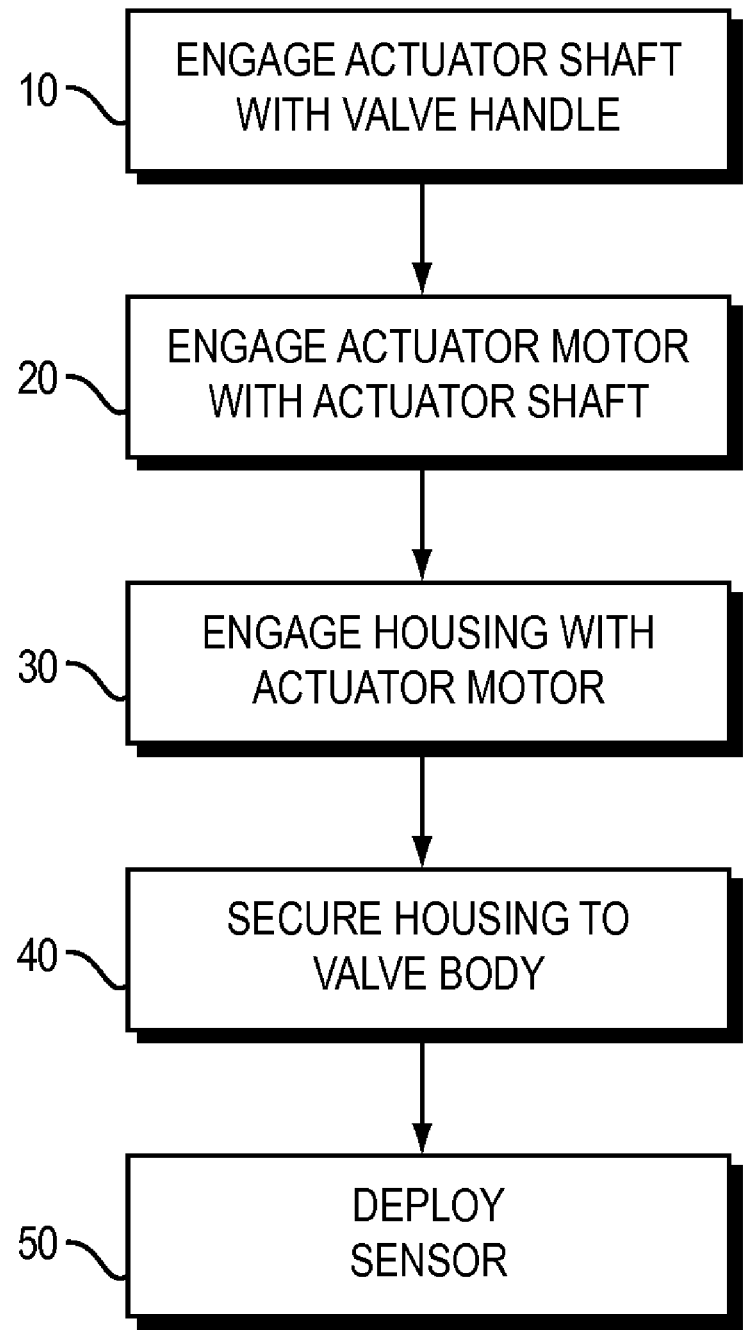
FIG. 10 is a flow chart of a methodology of the invention whereby the actuator is mounted on a manual valve, beginning with the shaft and engagement fork component, to which the motor and housing are then applied.

Referring to a methodology of the invention described by the flow chart of FIG. 10 for attaching a valve actuator to a manual valve, the description of FIGS. 9A and 9B is an example of step 10, engaging the actuator shaft with the valve handle. Thereafter in steps 20 and 30, which might occur in this or reverse order or be an integrated step, an actuator motor is slidingly and non-rotationally engaged with the shaft end of component 10, and a flexible housing is loosely engaged with the motor. The motor control circuit and power supply are understood to be included with the housing and connected to the motor. Step 40 provides for securing the housing to the valve body, examples of which are described elsewhere herein. And step 50 provides for deploying the sensor which triggers valve actuator, where desired, again as described elsewhere within.

Figure 11:
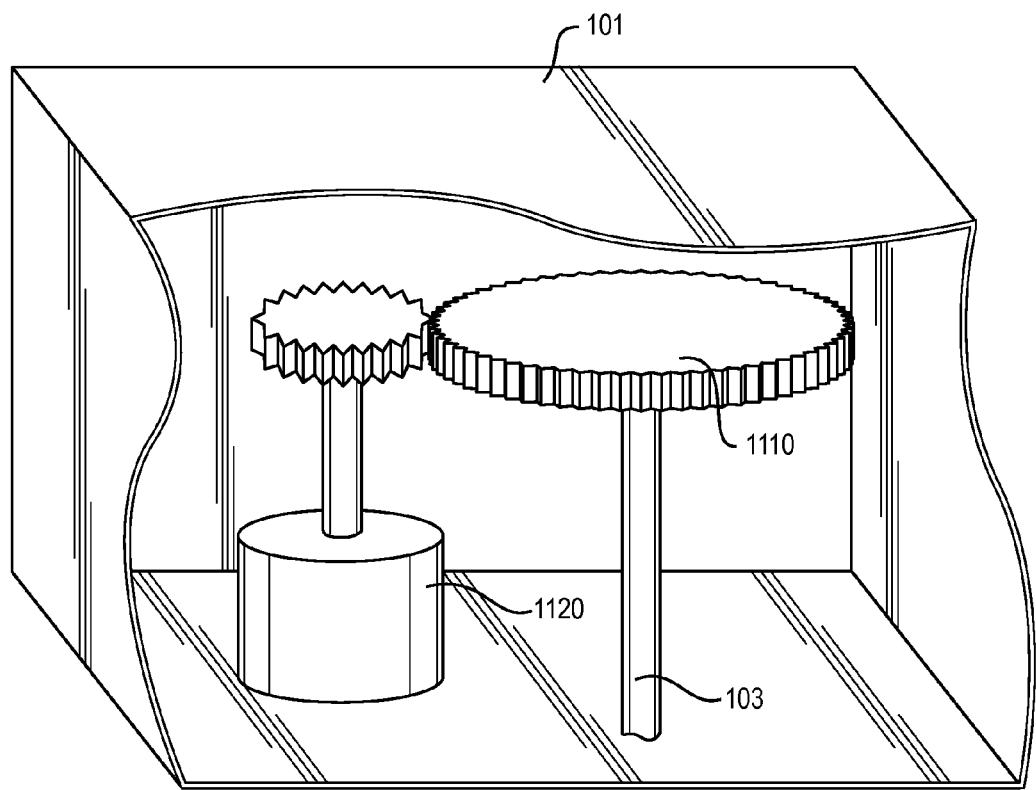
FIG. 11 is perspective view of a DC motor and reduction gear according to an embodiment of the present invention.

Referring now to FIG. 11, there is shown a perspective view of a DC motor 1120 and reduction gear 1110 coupled to shaft 103 which is part of the motor assembly 101 according to an embodiment of the present invention.

The invention is susceptible of many examples and variations. In one scenario, a valve actuator system of the invention is fastened to the manual main water supply valve of a building. The valve actuator is activated to turn the water supply off upon the occurrence of a condition that is indicative of a water leak, such as the presence of water at a sensor location for a predetermined period of time, or a critical level of water accumulating at a sensor site.

In another scenario, a valve actuator system of the invention is fastened to the manual main water supply valve of a building. The valve actuator is activated to turn the water supply off when a selected sensor or sensors indicate the building or a zone of a building has been unoccupied for a predetermined period of time, or after an extended power outage, perhaps accompanied by low inside temperatures. Alternatively, a valve actuator turns the water on for a predetermined period of time whenever occupancy is sensed. Occupancy sensing can be accomplished using a variety of methods including but not limited to acoustic sensing, infrared sensing, and visual sensing.

In yet another scenario, a valve actuator system of the invention is fastened to a control valve located inside a building that controls water to an outside water distribution line or system. The valve actuator turns the water on for a predetermined period of time, and off again thereafter.

In still another scenario, a valve actuator system of the invention is fastened to one or more valves that supply water to an appliance. The valve actuator turns the water on only when the water is needed to operate the appliance, and/or off when a problem with the appliance is indicated.

The invention is not limited in any way to the applications discussed. The invention can be used to provide automatic control of manual valves or dampers affecting the flow of liquid, gas or air in many systems and applications, whether in a standby, one cycle and reset mode, or in a continuously operating mode. In particular, the devices described earlier to be adapted to and control an individual manual valve may be operated or triggered by many means including the sensing of fluid, fluid level, current, voltage, occupancy, position, and instructions from a user interface.

One application of the automatic valve actuator is to protect real and personal property, such as buildings, fixtures and furnishings, against water damage that can occur when a water line downstream of an available manual shutoff valve fails or ruptures, and no one is available to recognize the problem or to operate the valve. A failure or rupture may be due to any of freezing, physical damage, overpressure, appliance failure or other anomaly. Although not limited in this way, the invention is useful in one respect as a relatively inexpensive way to reduce the risk of damage that can occur if a water supply pipe or other water line component freezes or breaks, or a water using appliance, such as a washing machine, dishwasher, ice maker, boiler, or water heater fails in a manner that allows the source water to be discharged continuously. The invention is also related to the field of protecting real property against damage or excess water usage when outdoor spigots (valves) are left open or hoses under pressure break. Among other advantages, when used this way, the invention will serve to conserve water.

The invention is susceptible of many variations and equivalents to the appended claims. For example, extending on the preceding description and the attached figures, there is a valve actuator system for operating a valve within a valve body installed in a fluid flow conduit, where the valve has a manually operable valve stem protruding from the valve body, that includes a motor; a power source for the motor; a motor control circuit; a signal input to the motor control circuit; an actuator shaft driven by the motor; from which extends an engagement fork; means for mounting the actuator and actuator control system proximate the valve stem whereby the engagement fork is brought into non-rigid, non-rotational engagement with the valve stem.

The valve may have a valve handle attached to the valve stem so as to define a plane of rotation and a diameter of rotation of the handle, where non-rigid, non-rotational engagement means that the engagement fork projects into the operating plane within the diameter of rotation so that rotation of the engagement fork causes rotation of the valve handle.

Non-rigid, non-rotational engagement in this context means a non-binding or sufficiently loose relationship between the fork and the valve handle or bracket to accommodate some misalignment or flexing of the engagement joint or union during valve actuation. The engagement joint or union may be limited purely to a state of rotational interference of a valve handle or a bracket attached to the valve handle with the engagement fork of the valve actuator system so that rotation of the engagement fork causes it to contact the valve handle or bracket, and force the valve into rotation as well.

There may be a flexible housing within which are housed the motor and the motor control circuit. The mounting of housing to valve body may be such that it resists rotation of more than 15 degrees with respect to the valve body when the valve actuator system is operating.

The motor may be loosely contained within the housing such that when it is operating, rotational stress from the fork/valve handle engagement is distributed by limited reorientation of the fork with respect to the handle and of the motor within the housing. The housing may flex somewhat, as well, in absorbing these stresses. The actuator shaft may have a limited range of translational freedom with respect to the motor, further absorbing stresses and facilitating installation and alignment.

A system sensor for sensing a pre-determined change in the value of a selected parameter may be local or remote to the housing, and may be in wireless or wired communication with the motor control circuit whereby the change in the value of the monitored parameter triggers valve operation by the system.

The sensor may be a water sensor, and the valve a shut-off valve in a waterline. The power supply may be house power, solar power, or a battery, and the motor may be a DC motor and reduction gear train. The housing may have a point of attachment to the valve body and be adjustable in height from its point of attachment so that the depth of the motor with respect to the plane of rotation can be set to a desired value. The system may be in communication with a computer for monitoring and control of the valve.

The motor and power source in combination may be a spring motor, and the motor control circuit may be a spring retention means releasable by an electronic signal that activates a solenoid spring release.

Means for mounting the actuator and actuator control system proximate the valve stem may use a valve handle attached to the valve stem and a bracket attached to the valve handle with which the engagement fork is brought into non-rigid, non-rotational engagement such that the shaft, bracket, and valve handle rotate together.

The invention is susceptible of many methods as well. For example, there is a method for installing a valve actuator on a manual valve having a valve body and a valve handle consisting of: engaging one end an actuator shaft with the valve handle whereby rotation of the actuator shaft rotates the valve handle; then slidingly and non-rotatingly engaging an actuator motor over the other end of the actuator shaft so allow the motor to drive the shaft and hence the valve handle; and then securing the motor against more than 15 degrees rotation relative to the valve body with a housing. The method may include deploying a sensor communicating with a motor control circuit controlling the actuator motor. Engaging one end of the actuator shaft with the valve handle may consist of the actuator shaft being configured with an engagement fork having at least one tine terminating in an L shape and the valve handle having a corresponding hole whereby the actuator shaft must be laid over with respect to the valve handle in order to initiate insertion of the tine in the hole, and then raised upright for full engagement of the tine in the hole.

The foregoing description of the embodiments of the invention has been presented for the purposes of illustration and description. It is not intended to be exhaustive or limiting of the scope of the invention.

What is claimed is:

1. A method for installing and using a powered valve actuator for operating a manual valve having a valve body, a valve stem and a valve handle, said valve body connected by a fluid flow conduit to a fluid source, said method comprising:
    engaging one end of an actuator shaft with the valve handle whereby rotation of the actuator shaft rotates the valve handle;
    slidingly and non-rotatingly engaging a motor assembly over the other end of the actuator shaft so as to allow a motor contained in the motor assembly to drive the actuator shaft and hence the valve handle;
    loosely enclosing said motor assembly within a housing and attaching said housing to at least one of the manual valve body and the fluid flow conduit such that when the motor is operating, torque is exhibited by limited rotation of said motor assembly within said housing in one direction relative to the valve body while said valve handle is being rotated in the other direction, thereby enabling the motor assembly to rotationally re-align up to 15 degrees relative to the valve body; and
    controlling the motor assembly thereby operating the manual valve.

2. The method of claim 1, said controlling the motor assembly comprising:
    deploying a sensor configured for triggering a start of the motor upon the occurrence of a predetermined first condition indicating a need for a valve position adjustment.

3. The method of claim 1, said engaging one end of the actuator shaft with the valve handle comprising orienting the actuator shaft in axial alignment with the valve stem.

4. The method of claim 1, said housing having a vertically adjustable means of attachment to the at least one of the valve body and the fluid flow conduit, attaching said housing to at least one of the manual valve body and the fluid flow conduit comprising selecting a desired height of the motor assembly with respect to the valve handle.

5. The method of claim 1, said motor assembly and said housing comprising in combination:
    a DC motor and reduction gear train;
    a motor control circuit; and
    a battery powering the DC motor and motor control circuit.

6. The method of claim 2, said controlling the motor assembly further comprising a motor control circuit configured for stopping the motor upon the occurrence of a predetermined second condition indicating a need to stop the valve position adjustment, said method further comprising:
    starting the motor upon the occurrence of the first condition; and
    stopping the motor upon the occurrence of the second condition.

7. The method of claim 6, wherein said manual valve is operated between fully opened and fully closed positions.

8. The method of claim 6, further comprising providing a timing signal to said motor control circuit wherein said manual valve is operated at or for desired times.

9. The method of claim 6, wherein said manual valve is operated for dynamic valve operation and flow control of fluid in the fluid conduit based on occurrences of the first and second conditions.

10. A method for installing and using a powered valve actuator for operating a manual valve having a valve body, a valve stem and a valve handle, said valve body connected by a fluid flow conduit to a fluid source, said method comprising:
    orienting an actuator shaft in axial alignment with the valve stem,
    engaging one end of the actuator shaft with the valve handle whereby rotation of the actuator shaft rotates the valve handle;
    slidingly and non-rotatingly engaging a motor assembly over the other end of the actuator shaft so as to allow a motor contained in the motor assembly to rotate the actuator shaft and hence the valve handle with respect to the valve body;
    loosely enclosing said motor assembly within a housing and attaching said housing to at least one of the manual valve body and the fluid flow conduit such that when the motor is operating, torque is exhibited by limited rotation of said motor assembly within said housing in one direction relative to the valve body while said valve handle is being rotated in the other direction, thereby enabling the motor assembly to rotationally re-align up to 15 degrees relative to the valve body; and
    deploying a sensor configured for triggering a start of the motor upon the occurrence of a predetermined first condition indicating a need for a valve position adjustment.

11. The method of claim 10, said housing having a vertically adjustable means of attachment to the at least one of the valve body and the fluid flow conduit, attaching said housing to at least one of the manual valve body and the fluid flow conduit comprising selecting a desired height of the motor assembly with respect to the valve handle.

12. The method of claim 10, said motor assembly and said housing comprising in combination:
 a DC motor and reduction gear train;
 a motor control circuit; and
 a battery powering the DC motor and motor control circuit.

13. The method of claim 10, said motor assembly configured for detecting a second condition indicating a need to stop the valve position adjustment, the method further comprising:
 starting the motor on the occurrence of said first condition;
 stopping the motor on the occurrence of a second condition.

14. The method of claim 13, further comprising:
 operating said manual valve between fully open and fully closed positions.

* * * * *